Figure 1:
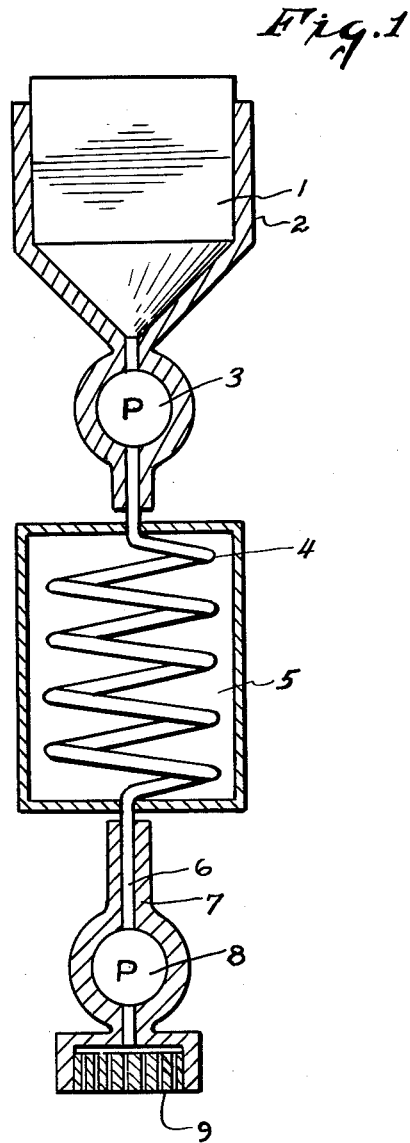

July 31, 1962 K. RYFFEL ET AL 3,047,541
PROCESS FOR THE CONTINUOUS PRODUCTION OF
POLYAMIDE FIBERS AND RIBBONS
Filed Aug. 5, 1958

- LACTAM MIXING VESSEL
- HEATED LACTAM PUMP
- HEATED REACTION PIPE
- HEATED POLYMER PUMP
- EXTRUDER

INVENTORS
KASPAR RYFFEL
BY HANS RUTISHAUSER
ERNST SCHWEIZER

MESTERN&MESTERN

United States Patent Office 3,047,541
Patented July 31, 1962

3,047,541
PROCESS FOR THE CONTINUOUS PRODUCTION OF POLYAMIDE FIBERS AND RIBBONS
Kaspar Ryffel, Ems, Hans Rutishauser, Winterthur, and Ernst Schweizer, Zollikon, Switzerland, assignors to Inventa A.G. für Forschung und Patentverwertung, Zurich, Switzerland
Filed Aug. 5, 1958, Ser. No. 753,266
1 Claim. (Cl. 260—78)

This invention relates to the continuous production of polyamide fibers and ribbons by polymerizing a lactam in a closed and totally filled vessel at elevated pressures, whereby a maximum of 1 percent water is present in a known manner as the sole agent promoting the reaction. The polymer melt thus obtained then is shaped in the customary manner.

This application is a continuation-in-part of our copending application Serial Number 442,352, filed July 9, 1954, now abandoned.

Several stabilizers have been proposed for the manufacture of polycaprolactam melts having stable viscosities which, after solidification and remelting, can be spun into fibers and ribbons (cf. French Patent 860,553 and German Patent 748,253). It also is known per se to carry out the polycondensation of ε-caprolactam continuously, in the presence of water as catalyst and without elevated pressures, and to shape the polymer directly afterward. Furthermore, it is known from U.S. Patent 2,241,322 how to polymerize ε-caprolactam in the presence of less than $\frac{1}{50}$ mol water as the sole catalyst under pressure, whereby, however, the water is evaporated in the final polymerization stage, and the polymer then is spun into fibers.

From the latter process (U.S. Patent 2,241,321) it can be concluded that water alone cannot be employed for the production of stable polymers because it is unable to form reactive end-groups. Therefore it has been the practice to prepare stable and uniform polycondensates from ε-caprolactam with the addition of both water and stabilizers whereby said stabilizers presumably act simultaneously as additional catalysts. As stabilizers, basic or acid substances of many different kinds have been suggested. The use of such stabilizers allows the remelting and shaping into threads, ribbons, etc. after solidification and comminution of the polymer without change in viscosity.

The polycondensation of ε-caprolactam using water as the sole catalyst usually is carried out in two steps, regardless of whether the process be continuous, as in German Patent 920,212, or batchwise, as in U.S. Patent 2,241,322. Thereby, a pre-polymerization is carried out in the first step in the presence of water, whereas the second step consists in the high-polymerization effected without pressure or even in vacuo and under evaporation of the water and conversion of the pre-polymer into a spinnable polycondensation product. However, it cannot be concluded from the cited patent that the polymers thus produced are homogeneous and stable with regard to viscosity.

It is known from the A.P.C. application S.N. 307,983, published April 27, 1943, how to polymerize lactam in the presence of very small quantities of water, e.g., $\frac{1}{50}$ mol, in a batchwise operation and without employment of a vacuum in the last step. This polymer contains 5–6 percent monomeric lactam and may be shaped directly following its manufacture. However, it is not known from any of the publications cited that lactam, in the presence of very small quantities of water as the sole foreign substance and acting as polycondensation catalyst and simultaneously as a molecular weight stabilizer, may be converted into polycaprolactam having uniform molecular weight and, therefore, uniform physical and textile properties, e.g., elasticity, dyeing properties, etc.

Because no other foreign substance beside water participates in the reaction, the polycondensation according to the present invention is carried out so that the water also serves as a stabilizer. In order to attain this effect, the polycondensation is effected continuously in a closed and totally filled vessel under pressure of 1 to 50 atmospheres so that the water present under no circumstances can escape as steam into the atmosphere or into the gas space of the reactor (there being no gas space), since otherwise it would not be available as a stabilizer.

This requires that the polyamide, immediately after polymerization, is shaped into fibers, yarns, etc., because it is not advisable to granulate the polymer as is customary in the spinning processes for the production of endless yarns, whereby the granulate is remelted and spun into yarns. The polycondensate according to the present invention would undergo an uncontrollable and non-uniform aftercondensation while splitting off water, were it remelted.

It has been found that heavier threads produced according to the present invention may be stretched before reeling up immediately after spinning, if these threads contain lower-molecular portions formed during the polymerization or still present, so that the hitherto customary pre-swelling process becomes unnecessary.

In order to facilitate the stretching following the shaping, the spun fibers may be prepared with emulsifying oils. After stretching and reeling, the yarns are washed in a known manner whereby the low-molecular portions are removed.

The process may be carried out in the equipment as shown in the accompanying drawings.

In FIGURE 1, the mixing vessel 1 is equipped with pump 3 and a heating mantle 2. This is connected with the reaction pipe 4 which has a separate heating mantle 5 and is connected through pipe 6 with the spinning pump 8. Pipe 6 and pump 8 are heated by a common heating mantle 7. The pressure in the polymerization pipe is regulated by a return flow pipe with regulating valve, not shown in the drawing, with the aid of which any excess lactam melt is carried back to the mixing vessel 1.

The polymerization according to the present invention is carried out in such a manner that a maximum amount of 1 percent water is added to the lactam. This mixture is kept in the mixing vessel 1 at a temperature above its melting point, but below 100° C. so that the added water cannot evaporate, and is fed continuously through pump 3 into pipe 4 which is heated to the polymerization temperature. The pipe may be provided with means which effect an equalization of the flow of the material to approximately the same speed for the entire mass present in the pipe. The length of the pipe which may be coiled is calculated so that the minimum dwelling time of the lactam-water mixture is eight hours.

Immediately connected to the polymerization pipe is pump 8 which presses the material through the extrusion device 9. The latter may have the shape of a spinning jet for fibers of fine titer or for the manufacture of monofilaments or as a slit jet for the formation of ribbons.

Figure 2:
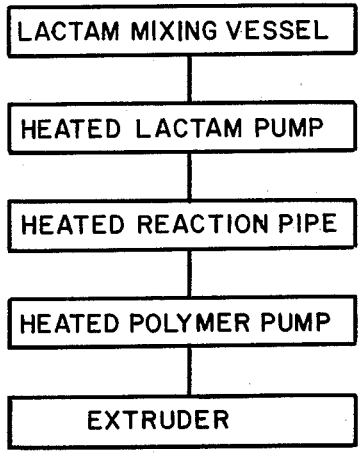

FIGURE 2 is a flow sheet indicating the function of each element in FIGURE 1.

Through the process according to the invention, i.e., through the application of a maximum of 1 percent water, evaporation is avoided, and, due to the uniform distribution of the water in the polymer formed, a product is obtained which has uniform viscosity. The material thus produced, owing to its high acid bonding value, as compared to polycaprolactams hitherto known, has a better affinity for acid dyes.

The addition of water also may be effected in form of substances which split off water under the given polymerization conditions, as, e.g., by addition of ω-amino acids or of salts of ω,ω-dicarboxylic acids and ω,ω-diamines.

Furthermore, the material thus obtained is easily stretched. The stretching process advantageously is carried out directly on the reeling machine whereby the yarn is prepared before stretching with an emulsifying oil. The stretching process, immediately following the spinning step, facilitates higher stretch than hitherto customary so that materials may be produced having a very low elongation at break, the lower limit being up to 12 percent.

The invention will now be further explained by means of the following examples. However, it should be understood that these are given merely by way of illustration, not of limitation, and that many changes may be made in the details without departing from the spirit of the present invention.

*Example 1*

A mixture of lactam and 1% water is fed into the polymerization apparatus above described and the dwelling time for the material in the tube is adjusted to approximately 10 hours. At the end of this time, the polymer is pressed, by means of a pump, through a spinning nozzle with a plurality of openings and is fed at a rate of 250 meters to a first roller of a drawing device, on which it winds itself once or several times. The quantity which the spinning pump feeds is so adjusted that the total titer will be 120 deniers. Thereafter, the material is fed to the second roller where it winds itself again once or several times. The second roller has a peripheral speed of 1,000 meters so that the material is stretched at a ratio of 1:4. The stretched endless yarn has a total titer of 30 deniers. Its strength is 4 g./den. and its elongation at break is 25 percent.

*Example 2*

A mixture of lactam with 0.5% water is fed into the described polymerization apparatus and the time of stay in the tube adjusted to about 24 hours. After polymerization has taken place, the polymer is fed from the discharge end of the apparatus by means of a spinning pump through a nozzle having a plurality of holes and fed at the rate of 250 meters over the first drawing roller, winding itself over this roller once or several times. The feeding rate of the spinning pump is so adjusted that a total titer of 120 deniers will be obtained. From there, the material is fed to the second roller, on which it winds itself likewise once or several times. The peripheral speed of the second roller is 1,050 meters, so that the material is stretched at a ratio of 1:4.2. The stretched endless yarn has a total titer of 30 deniers. Its strength is 6 g./den. and its elongation at break is 18 percent.

*Example 3*

A mixture of lactam with 0.25% water is introduced into the polymerization apparatus above described where it remains in the reaction pipe for approximately 36 hours.

The polymer is fed directly from the device, by means of a spinning pump with a nozzle having a plurality of holes, at a rate of 250 meters over the first drawing roller on which it winds itself once or several times. The feeding speed of the pump is so adjusted that a total titer of 120 deniers will be obtained. From the first roller the material is fed to the second roller where it winds itself once or several times. The second roller has a peripheral speed of 1,150 meters, so that the material is stretched at a ratio of 1:4.6. The stretched endless yarn has a total titer of 30 deniers. Its strength is 7 g./den. and its elongation at break is 12 percent.

Instead of adding the water directly to the lactam, it may be added by introducing a substance which is capable of splitting off water under polymerization conditions. As a means for introducing water in this way, we mention omega-amino acids or salts thereof; furthermore, salts of omega, omega-dicarboxylic acids and omega, omega-diamines.

*Example 4*

Into the polymerization apparatus described above, a mixture of lactam with the acid known as epsilon amino caproic acid is introduced in the following amount: for each kilogram of the lactam, 21 g. of the acid are added which corresponds to 0.3% of water in the polymerization mixture.

The procedure is as outlined in Examples 1 to 3. The time of polymerization is 10 hours. The quantity which the spinning pump feeds is so adjusted that the total titer will be 252 deniers. The ratio of stretching is 1:4.2. The stretched endless yarn has a total titer of 60 deniers. Its strength is 6.1 g./den., and the elongation at break is 17 percent.

We claim:

A process for the continuous production of polyamide fibers by polymerization of episilon-caprolactam, which consists of continuously admixing to said lactam, as the sole polymerization catalyst, water in an amount up to 1 percent based on said lactam, continuously polymerizing said lactam plus water to a polyamide under pressure and at temperatures above the melting point of said polyamide but below 100° C. in a completely filled vessel to exclude air, continuously extruding said polyamide and immediately stretching the extrudate.

References Cited in the file of this patent

UNITED STATES PATENTS

| | | |
|---|---|---|
| 2,241,321 | Schlack | May 6, 1941 |
| 2,241,322 | Hanford | May 6, 1941 |

OTHER REFERENCES

Ser. No. 307,983, Schlack (A.P.C.), published Apr. 27, 1943.